US012196414B2

(12) United States Patent
Andersson et al.

(10) Patent No.: US 12,196,414 B2
(45) Date of Patent: Jan. 14, 2025

(54) DEVICE AND METHOD FOR SORTING A PARTICULATE STREAM

(71) Applicant: E.ON ENERGIINFRASTRUKTUR AB, Malmö (SE)

(72) Inventors: Bengt-Ake Andersson, Mölnlycke (SE); Fredrik Lind, Torslanda (SE); Viktor Stenberg, Olofstorp (SE)

(73) Assignee: E.ON ENERGIINFRASTRUKTUR AB, Malmö (SE)

( * ) Notice: Subject to any disclaimer, the term of this patent is extended or adjusted under 35 U.S.C. 154(b) by 0 days.

(21) Appl. No.: 18/032,398

(22) PCT Filed: Nov. 2, 2021

(86) PCT No.: PCT/EP2021/080397
§ 371 (c)(1),
(2) Date: Apr. 18, 2023

(87) PCT Pub. No.: WO2022/090571
PCT Pub. Date: May 5, 2022

(65) Prior Publication Data

US 2024/0009705 A1 Jan. 11, 2024

(30) Foreign Application Priority Data

Nov. 2, 2020 (EP) .................................... 20205149

(51) Int. Cl.
*F23C 10/10* (2006.01)
*B03B 9/04* (2006.01)
(Continued)

(52) U.S. Cl.
CPC ................ *F23C 10/10* (2013.01); *B03B 9/04* (2013.01); *B07B 1/20* (2013.01); *B07B 1/54* (2013.01); *B07B 13/07* (2013.01); *F23C 2206/10* (2013.01)

(58) Field of Classification Search
CPC ........ F23C 10/10; F23C 2206/10; B03B 9/04; B07B 1/20; B07B 1/54; B07B 13/07; B07B 13/003
See application file for complete search history.

(56) References Cited

U.S. PATENT DOCUMENTS 856,894 A 6/1907 Merrell
4,208,274 A * 6/1980 Satake .................. B07B 13/003 209/616

(Continued)

FOREIGN PATENT DOCUMENTS

CN 205236354 5/2016
CN 109290205 2/2019

(Continued)

OTHER PUBLICATIONS

International Search Report & Written Opinion, International Patent Application No. PCT/EP2021/080398, dated Feb. 11, 2022, 6 pages.

(Continued)

*Primary Examiner* — Jacob S. Scott
*Assistant Examiner* — Miraj T. Patel
(74) *Attorney, Agent, or Firm* — Casimir Jones, S.C.; Brian F. Bradley

(57) ABSTRACT

The invention relates to a device for continuously sorting a particulate stream, comprising: a) a conveyor (1) for conveying the particulate stream to a separation device, b) a sieve (7) for separating the particulate stream according to size, characterized in that it further comprises c) a per-sieve (3) comprising elongated sieve openings located between the convey or outlet and the sieve d) and a mechanical impact device for providing mechanical impacts to the pre-sieve (3). The pre-sieve allows to separate elongated objects like threads or wires form the particulate stream (Continued)

Figure 1:
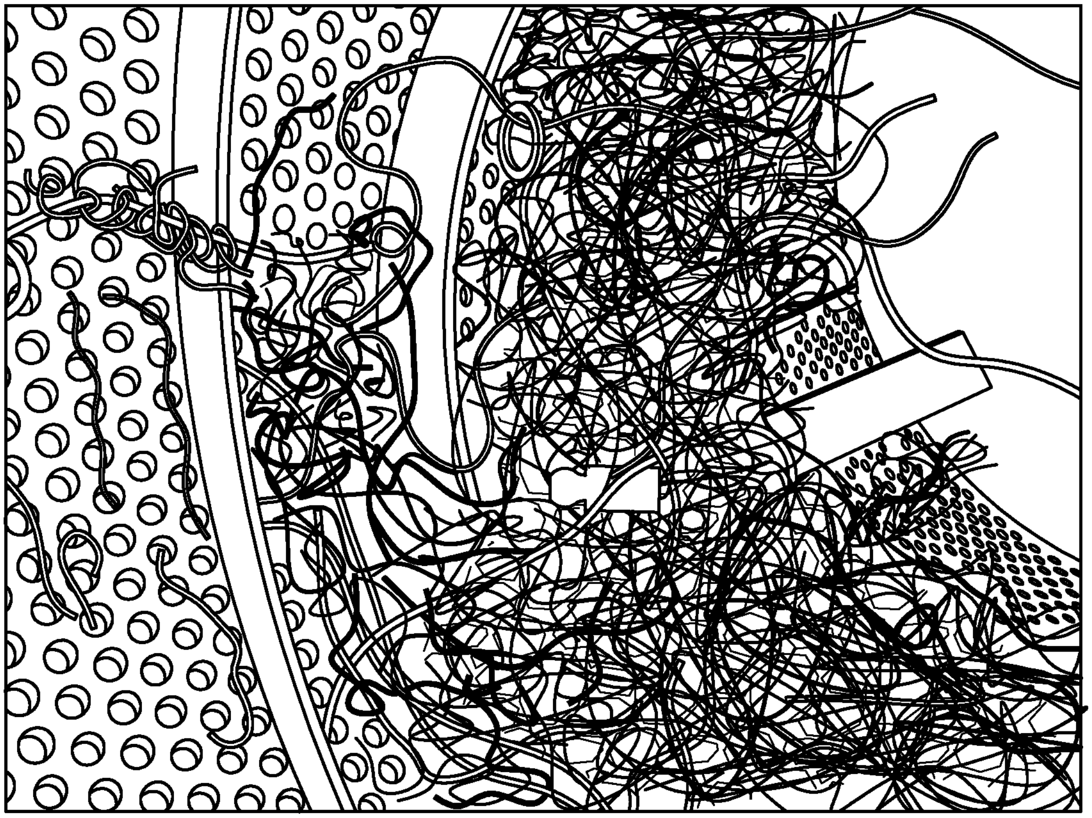

which would otherwise clog or block subsequent separation devices including the sieve.

22 Claims, 6 Drawing Sheets

(51) Int. Cl.

| | |
|---|---|
| ***B07B 1/20*** | (2006.01) |
| ***B07B 1/54*** | (2006.01) |
| ***B07B 13/07*** | (2006.01) |

(56) References Cited

U.S. PATENT DOCUMENTS

| | | | | |
|---|---|---|---|---|
| 4,839,035 | A * | 6/1989 | Iafrate | B07B 13/16 209/675 |
| 5,632,380 | A | 5/1997 | Weick et al. | |
| 6,360,895 | B1 | 3/2002 | Riggenmann | |
| 6,484,882 | B1 | 11/2002 | Boretzky et al. | |
| 6,953,517 | B1 | 10/2005 | Boretzky et al. | |
| 2020/0179993 | A1 * | 6/2020 | Rizzi | B01J 2/18 |

FOREIGN PATENT DOCUMENTS

| | | |
|---|---|---|
| CN | 209424016 | 9/2019 |
| DE | 10335881 | 3/2005 |
| EP | 0086488 | 8/1983 |
| EP | 1079939 | 3/2001 |
| EP | 2676742 | 12/2013 |
| EP | 2915603 | 9/2015 |
| FR | 2545385 | 11/1984 |
| JP | 2003251280 | 9/2003 |
| JP | 6017192 | 10/2016 |
| WO | 99/61174 | 12/1999 |
| WO | 00/53385 | 9/2000 |
| WO | 2018/188786 | 10/2018 |
| WO | 2018/192680 | 10/2018 |

OTHER PUBLICATIONS

International Search Report & Written Opinion, International Patent Application No. PCT/EP2021/080397, dated Feb. 3, 2022, 6 pages.
Search Report, EP Patent Application No. 20205149.6, dated May 4, 2021, 6 pages.

* cited by examiner

DEVICE AND METHOD FOR SORTING A PARTICULATE STREAM

The present invention relates to a device for continuously sorting a particulate stream, the use of this device for the separation of a particulate ash stream from a fluidized bed boiler, and a method for operating a fluidized bed boiler.

Fluidized bed combustion is a well-known technique, wherein the fuel is suspended in a hot fluidized bed of solid particulate material, typically silica sand and/or fuel ash. Other bed materials are also possible. In this technique, a fluidizing gas is passed with a specific fluidization velocity through a solid particulate bed material. The bed material serves as a mass and heat carrier to promote rapid mass and heat transfer. At very low gas velocities the bed remains static. Once the velocity of the fluidization gas rises above the minimum fluidization velocity, at which the force of the fluidization gas balances the gravity force acting on the particles, the solid bed material behaves in many ways similarly to a fluid and the bed is said to be fluidized. In bubbling fluidized bed (BFB) boilers, the fluidization gas is passed through the bed material to form bubbles in the bed, facilitating the transport of the gas through the bed material and allowing for a better control of the combustion conditions (better temperature and mixing control) when compared with grate combustion. In circulating fluidized bed (CFB) boilers the fluidization gas is passed through the bed material at a fluidization velocity where the majority of the particles are carried away by the fluidization gas stream. The particles are then separated from the gas stream, e.g., by means of a cyclone, and recirculated back into the furnace, usually via a loop seal. Usually oxygen containing gas, typically air or a mixture of air and recirculated flue gas, is used as the fluidizing gas (so called primary oxygen containing gas or primary air) and passed from below the bed, or from a lower part of the bed, through the bed material, thereby acting as a source of oxygen required for combustion. A fraction of the bed material fed to the combustor escapes from the boiler with the various ash streams leaving the boiler, in particular with the bottom ash. Removal of bottom ash, i.e. ash in the bed bottom, is generally a continuous process, which is carried out to remove alkali metals (Na, K) and coarse inorganic particles/lumps from the bed and any agglomerates formed during boiler operation, and to keep the differential pressure over the bed sufficient. In a typical bed management cycle, bed material lost with the various ash streams is replenished with fresh bed material.

From the prior art it is known to replace a fraction or all of the silica sand bed material with ilmenite particles in the CFB process (H. Thunman et al., Fuel 113 (2013) 300-309). Ilmenite is a naturally occurring mineral which consists mainly of iron titanium oxide ($FeTiO_3$) and can be repeatedly oxidized and reduced. Due to the reducing/oxidizing feature of ilmenite, the material can be used as oxygen carrier in fluidized bed combustion. The combustion process can be carried out at lower air-to-fuel ratios with the bed comprising ilmenite particles as compared with non-active bed materials, e.g., 100 wt.-% of silica sand or fuel ash particles.

The problem underlying the invention is to provide a device and method allowing to improve bed management cycles.

A device for continuously sorting a particulate stream according to the invention comprises:

a) a conveyor for conveying the particulate stream to a separation device, b) a sieve for separating the particulate stream according to size, characterized in that it further comprises c) a pre-sieve comprising elongated sieve openings located between the conveyor outlet and the sieve d) and a mechanical impact device for providing mechanical impacts to the pre-sieve (3).

First, several terms are explained in the context of the invention.

The conveyor serves to convey a particulate stream, typically a particulate stream having particles in a size range of several μm to mm. A preferred example of such a particulate stream is an ash stream from a fluidized bed boiler as explained below. The invention is not limited thereto and might be used in the context of other particulate streams. The term "particulate stream" is intended to cover streams of granules or other particulate matter. In the context of the invention, this particulate stream may be contaminated with elongate objects as will be explained below.

Examples of suitable conveyors are screw conveyors and scrape conveyors. These are well known to persons skilled in the art.

The term sieve is used as known to any persons skilled in the art. A sieve as used in the present invention typically has a mesh size adapted to the particle size of the particulate stream so that it can separate this particulate stream into a coarse and a fine fraction.

The device according to the present invention further comprises a pre-sieve with elongated sieve openings. This pre-sieve is located between the conveyor outlet and the sieve. Located between means that the particulate stream from the outlet of the conveyor passes the pre-sieve prior to the parts or fractions of the particle stream passing this pre-sieve entering the sieve.

Elongated sieve openings have a ratio of length to maximum 20 width of 4 or more, preferably 10 or more. A typical upper limit of this ratio is 100, preferred upper limits are 80, 60, 40 or 20.

The invention is based on the finding that particulate streams, in particular ash streams from fluidized bed boilers, may be contaminated with elongated objects, in particular metallic objects like threads or wires. This is a particularly prominent problem for boilers burning waste, wood residues or the like. Such objects tend to clog and block sieves used for separating the ash stream according to size. The pre-sieve according to the present invention allows to separate such elongate objects from the particulate stream prior to feeding the particulate stream to the sieve. The elongated sieve openings cause particulate material to fall through whereas elongated objects are typically transported over the area of the elongated openings and are falling off the pre-sieve at the far end. The elongated objects therefore can be effectively separated from the particulate stream. At the same time, the elongate openings tend not to be clogged by the elongate objects as standard sieves in the prior art.

Fluidized bed boiler is a term well known in the art. The invention can be used in particular for bubbling fluidized bed (BFB) boilers, and circulating fluidized bed (CFB) boilers.

The device further comprises a mechanical impact device for providing mechanical impacts to the pre-sieve.

The mechanical impact device effectively prevents finer particles of the particulate stream, particularly bottom ash, from forming a layer of material on the pre-sieve. The mechanical impact device will cause any layer to disintegrate, with the fine-grained particles falling down through the pre-sieve to the mechanical sieve and the coarse material passing over the pre-sieve continuing to the reject container.

Preferably, the mechanical impact device is a hammer or piston-vibrator.

Preferably, the impacting force and impacting frequency of the mechanical impact device is controllable and may be set in an electronic control system of the whole device. The impact device or hammer may e.g. comprise a pneumatic or electric drive mechanism. During continuous operation of the impact device, no layer of blocking layer of ash is formed on the pre-sieve.

Preferably, the mechanical impact device provides impacts in the area of the base of the fingers of the pre-sieve. More than one mechanical impact device, optionally at different locations of the pre-sieve, may be used.

In a preferred embodiment, the pre-sieve comprises elongated sieve openings including an angle of −40° to 40° with the conveying direction of the conveyor. For a screw conveyor, the conveying direction corresponds to the axis of the screw. For a scraper conveyor, the conveying direction corresponds to the moving direction of the scraping devices. The acute angle of −40° to 40° is defined between the conveying direction and the longitudinal axis of the elongated openings. This angle relative to the conveying direction allows efficient separation of the particulate stream from elongated objects without or with minimal clogging.

In a preferred embodiment, the conveyor is a screw conveyor.

In a particularly preferred embodiment, the pre-sieve encloses part of the circumference of the conveyor screw in an axial end portion of the conveyor screw. This means that the pre-sieve is in close proximity to an end portion of the conveyor screw so that this conveyor screw conveys all material not falling through the elongated openings towards the end of the pre-sieve so that particularly threads and wires are easily separated from the particulate material falling through the elongated openings. This close proximity also prevents clogging of or material nest buildup on the pre-sieve.

To achieve such close proximity, preferably the radial distance between the conveyor screw and the pre-sieve is less than 10%, preferably less than 5% of the conveyor screw diameter.

If a scraper conveyor is used, the pre-sieve is preferably arranged in an end portion of the scraper conveyor and the scraping devices are arranged to scrape over the pre-sieve in similarly close proximity.

Preferably, the pre-sieve comprises elongate openings formed by fingers extending towards an end portion of the pre-sieve with the tips of the fingers not being connected in that end portion. This structure effectively prevents clogging and material buildup on the pre-sieve as any material reaching the end portion of the pre-sieve can easily fall off without structural elements transversal to the conveying direction potentially blocking the material. In particular, wires and threads cannot be blocked or get entangled at this end portion.

Preferably, the width of the elongate openings increases from the base to the tip of the fingers. This contributes to preventing material buildup or material nests on the pre-sieve.

Preferably, the increase in width is by a factor of 2 to 6, preferably 3 to 5.

The features listed below are particularly preferred embodiments of the device according to the present invention. Each of these features may be utilized individually or in combination with one or more of the other listed features:

a) the width of the elongate openings at the base is between 1 and 5 mm, preferably 2 and 4 mm;

b) the width of the elongate openings at the tip of the fingers is between 4 and 20 mm, preferably 8 and 16 mm, further preferred 10 and 14 mm;

c) the length of the fingers from base to tip is between 100 and 500 mm, preferably 100 and 400 mm, preferably 150 and 250 mm.

d) the mesh size of the sieve is between 200 and 1,000 μm, preferably 300 and 800 μm.

Another aspect of the present invention is the use of a device as heretofore disclosed for the separation of a particulate ash stream from a fluidized bed boiler.

Another aspect of the invention is a method for operating a fluidized bed boiler, comprising the steps of:

a) carrying out a fluidized bed combustion process;

b) removing at least one ash stream from the fluidized bed boiler;

c) separating the ash stream into at least two fractions, wherein the separation includes a separation step using a device as heretofore disclosed;

d) recirculating a separated particle fraction into the bed of the fluidized bed boiler.

The boiler may for example be a bubbling fluidized bed boiler (BFB) or a circulating fluidized bed boiler (CFB), CFB boilers being preferred.

The method of the invention is particularly advantageous for a boiler wherein a fraction of or all of the standard silica sand bed material is replaced with ilmenite particles. The method allows to recirculate ilmenite particles from the ash stream back into the fluidized bed as will be explained in greater detail below.

Therefore, in a preferred embodiment, the fluidized bed and the ash stream from the fluidized bed comprise ilmenite particles and the separated recirculated particle fraction is enriched in ilmenite.

The method may comprise additional separation steps as will be explained below. Preferably, the separation includes a step of using a magnetic separator comprising a field strength of 2,000 Gauss or more, preferably 4,500 Gauss or more. The field strength of the magnetic separator is preferably determined on the surface of the transport means for the bed material undergoing magnetic separation.

In the operation of the boiler, the fraction of ilmenite in the bed material can be kept at 25 wt. % or more, preferably 30 wt. % or more. In another embodiment of the invention, preferred ilmenite concentrations in the bed are between 10 wt. % and 95 wt.-%, more preferably between 50 wt.-% and 95 wt. %, more preferably between 75 wt.-% and 95 wt.-%.

Ilmenite particles can be conveniently separated from the boiler ash using a three-stage separation process including pre-sieving as heretofore disclosed, sieving and subsequent magnetic separation. Even after extended use as bed material in a fluidized bed boiler, ilmenite still shows good oxygen-carrying properties and reactivity towards oxidizing carbon monoxide (CO) into carbon dioxide ($CO_2$), so called “gas conversion” and good mechanical strength. The attrition rate of the ilmenite particles decreases after an extended residence time in the boiler and the mechanical strength is still very good after the ilmenite has been utilized as bed material for an extended period of time.

In light of the good attrition resistance and the good oxygen-carrying properties of used ilmenite particles can be exploited by recirculating the separated ilmenite particles into the boiler bed. This reduces the need to feed fresh ilmenite to the boiler which in turn significantly reduces the overall consumption of the natural resource ilmenite and makes the combustion process more environmentally friendly and more economical. In addition, the separation of ilmenite from the ash and recirculation into the boiler allows for the control of the ilmenite concentration in the bed and eases operation. Furthermore, this bed management cycle further increases the fuel flexibility by allowing to decouple the feeding rate of fresh ilmenite from the ash removal rate, in particular the bottom ash removal rate. Thus, changes in the amount of ash within the fuel become less prominent since a higher bottom bed regeneration rate can be applied without the loss of ilmenite from the system.

Fresh ilmenite particles fed to the bed may be rock or sand ilmenite.

Hard rock or massive ilmenite is available in igneous rock deposits, e.g. in Canada, Norway and China. The content of TiO2 in rock ilmenite is rather low (typically 30-50 mass-%) but its iron content is relatively high (typically 30-50 mass-%). The rock ilmenite is mined and upgraded via crushing and separation from impurities. This yields that the sphericity of rock ilmenite is lower than e.g. natural silica sand. The shape factor of Norwegian rock ilmenite (as provided by Titania A/S) is around 0.7.

Ilmenite sand (less preferred) can be found in placer deposits of heavy minerals occurring for example in South Africa, Australia, North America and Asia. Generally, sand ilmenites stem from weathered rock deposits. The weathering causes the iron content to decrease while increasing the concentration of TiO2. Due to the natural iron oxidation and dissolution, hence also called altered ilmenite, the TiO2 content can be as high as 90 wt. %. The shape factor of sand ilmenites typically is in the range 0.8-1 with a mean factor value of around 0.9.

Preferably, the fresh ilmenite particles comprise a particle size distribution with a maximum at 100 to 400, further preferred 150 to 300 μm.

To determine particle size distribution, sieving with an appropriate sequence of mesh sizes is used. Sieving plates of the following mesh size may be used: 355 μm, 250 μm, 180 μm, 125 μm, 90 μm and a bottom plate for fractions below 90 μm.

Preferably, the at least one ash stream is selected from the group consisting of bottom ash stream and fly ash stream. Most preferably the at least one ash stream is a bottom ash stream. In advantageous embodiments, any combination of two or more ash streams is possible. Bottom ash is one of the major causes for the loss of bed material in fluidized bed boilers and in a particularly preferred embodiment the at least one ash stream is a bottom ash stream. Fly ash is that part of the ash, which is entrained from the fluidized bed by the gas and flies out from the furnace with the gas or gaseous ash compounds condensing to form solid particles after leaving the furnace.

Preferably, the sieve for separating the particulate stream according to size comprises a mesh size from 200 to 1,000 μm, preferably 300 to 800 μm, further preferred 400 to 600 μm.

The majority of ilmenite in the bottom ash comprises a particle size of 500 μm or lower so that the sieve provides a fine particle size fraction having a more homogenous size distribution while still comprising the majority of the ilmenite particles. The magnetic separation in the second step can then be carried out more efficiently.

The initial pre-sieving with a pre-sieve comprising elongated sieve openings contributes to protect both the sieve and the magnetic separator from elongated objects such as nails, wires or threads which could otherwise block the sieve or damage the magnetic separator or its parts.

The magnetic separator comprises a field intensity of 2,000 Gauss or more, preferably 4,500 Gauss or more on the surface of the transport means of the bed material. This has been found effective to separate ilmenite from ash and other nonmagnetic particles in the particle stream.

Preferably, the magnetic separator comprises a rare earth roll (RER) or rare earth drum (RED) magnet. Corresponding magnetic separators are known in the art per se and are e.g. available from Eriez Manufacturing Co. (www.eriez.com). Rare earth roll magnetic separators are high intensity, high gradient, permanent magnetic separators for the separation of magnetic and weakly magnetic iron-containing particles from dry products. The ash stream is transported on a belt which runs around a roll or drum comprising rare earth permanent magnets. While being transported around the roll ilmenite remains attracted to the belt whereas the nonmagnetic particle fraction falls off. A mechanical separator blade helps to separate these two particle fractions.

In one embodiment of the invention, the magnetic field is axial, i.e. parallel to the rotational axis of the drum or roll. An axial magnetic field with the magnets having a fixed direction causes strongly magnetic material to tumble as it passes from north to south poles, releasing any entrapped nonmagnetic or paramagnetic materials.

In another embodiment of the invention the magnetic field is radial, i.e. comprising radial orientation relative to the rotational axis. Generally, a radial orientation has the advantage of providing a higher recovery rate of all weakly magnetic material which can come at the cost of less purity due to entrapped nonmagnetic material.

It is also possible to use a two-stage magnetic separation with a first step using axial orientation thereby helping to release entrapped nonmagnetic material and the second step using radial orientation to increase the recovery rate. It is also within the scope of the invention to use radial orientation in the first step and axial orientation in the second step.

Preferably the average residence time of the ilmenite particles in the fluidized bed boiler is at least 100 h, further preferably at least 200 h, further preferably at least 300 h. Even after approx. 300 h of continuous operation in a fluidized bed boiler, ilmenite particles still show very good oxygen-carrying properties, gas conversion and mechanical strength, clearly indicating that even higher residence times are achievable.

In preferred embodiments, the average residence time of the ilmenite particles may be less than 600 h, further preferably less than 500 h, further preferably less than 400 h, further preferably less than 350 h. All combinations of stated lower and upper values for the average residence time are possible within the context of the invention and herewith explicitly disclosed.

Preferably, the separation efficiency of the method for ilmenite bed material is at least 0.5 by mass, preferably at least 0.7 by mass. That means that at least 50 or 70 wt. % of ilmenite comprised in the ash stream can be separated from the ash and recirculated into the boiler. In the context of the invention, the term wt. % is used as a synonym for mass %.

The recirculation capacity and separation efficiency are also affected by the ash flow temperature where there is a trade-off between the separation efficiency and the ash flow temperature. A higher temperature will decrease the efficiency of the magnetic separation and leads to the use of more expensive heat resistant materials in the system used to carry out the inventive method. By adopting measures for cooling the ash flow the negative effects on the separation efficiency and material requirements of high temperatures can be negated. The system can also be equipped with temperature sensors and ash flow splitters that will allow the flow to be redirected and bypassing the separation system in case of temporary high temperatures.

Embodiments of the invention are now shown by way of example with reference to the figures.

Figure 2:
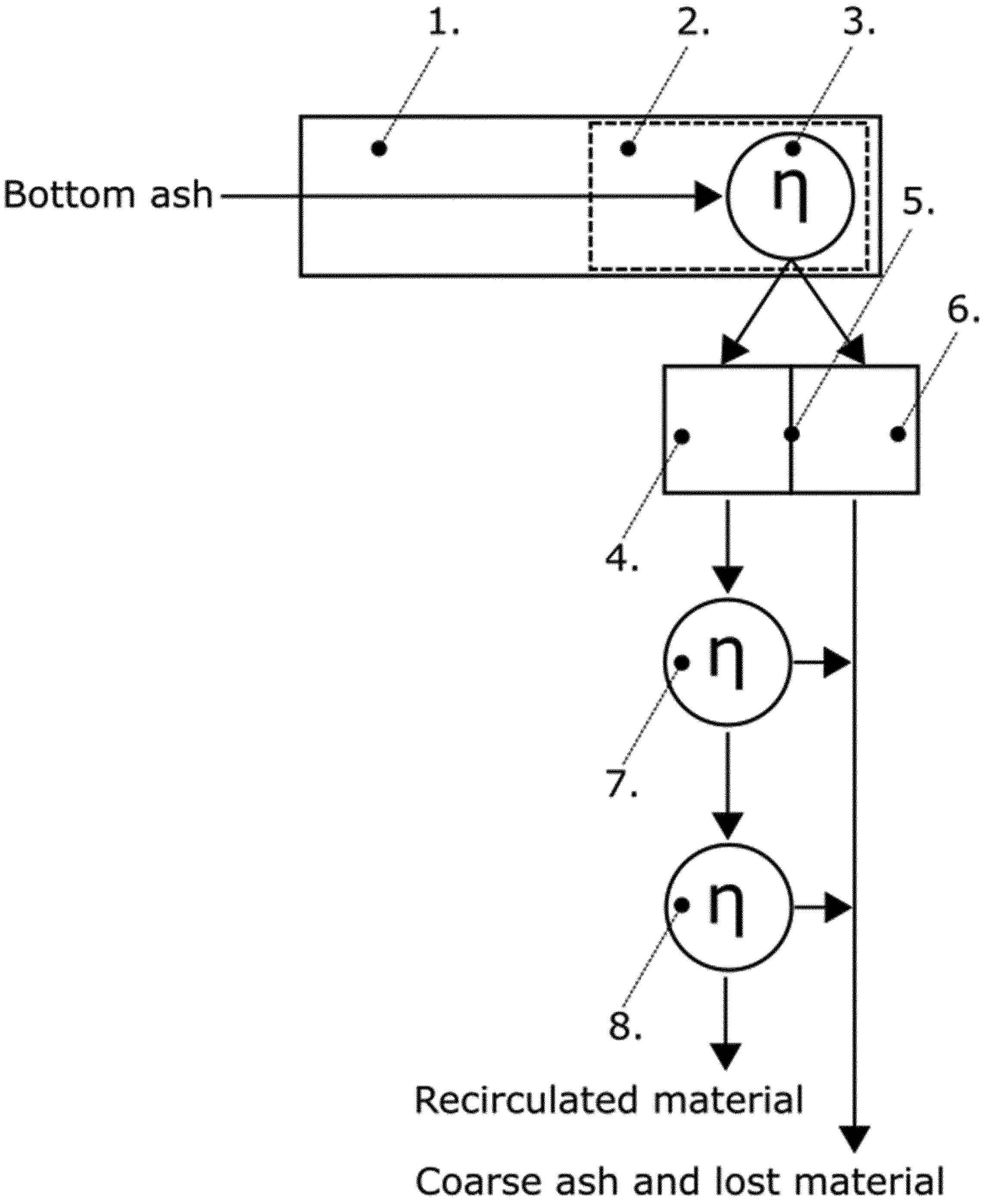
Figure 3:
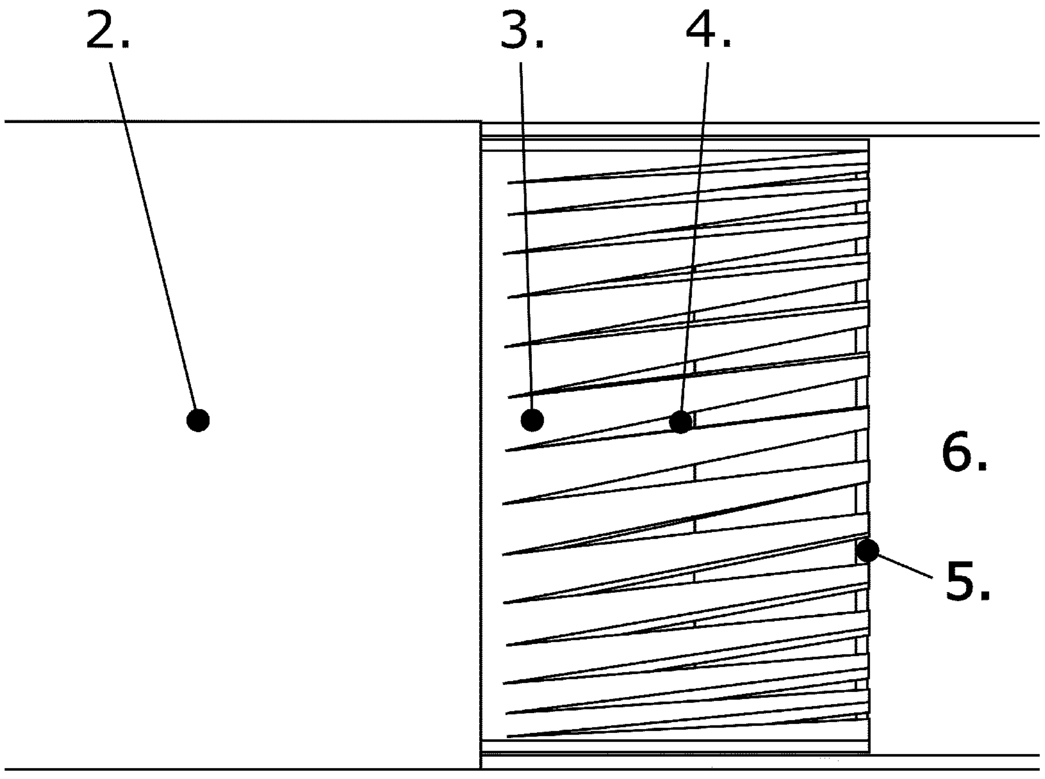
Figure 4:
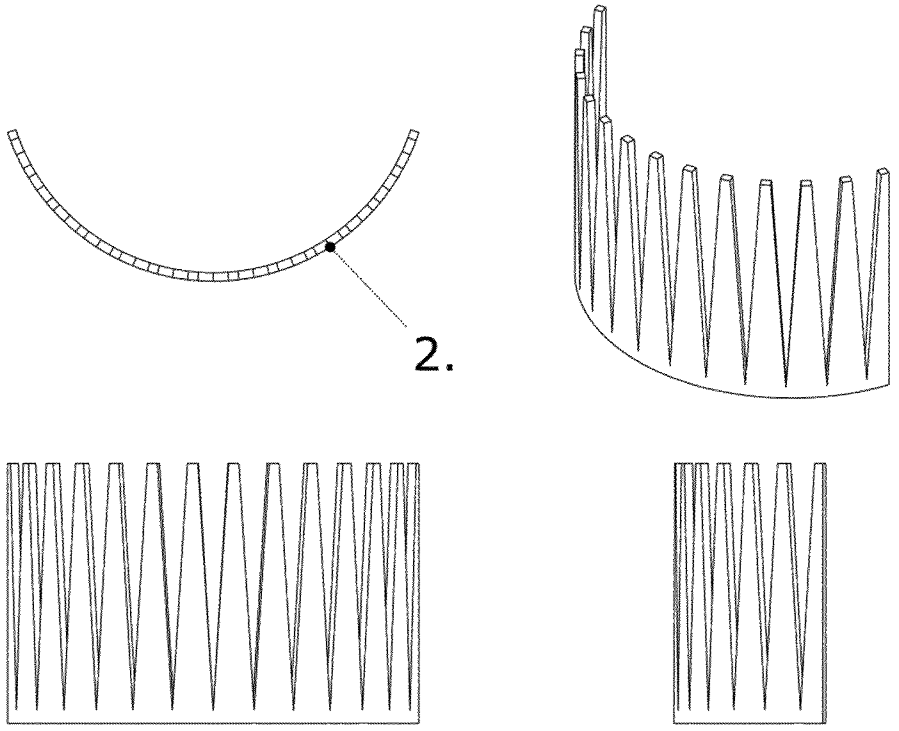
Figure 5:
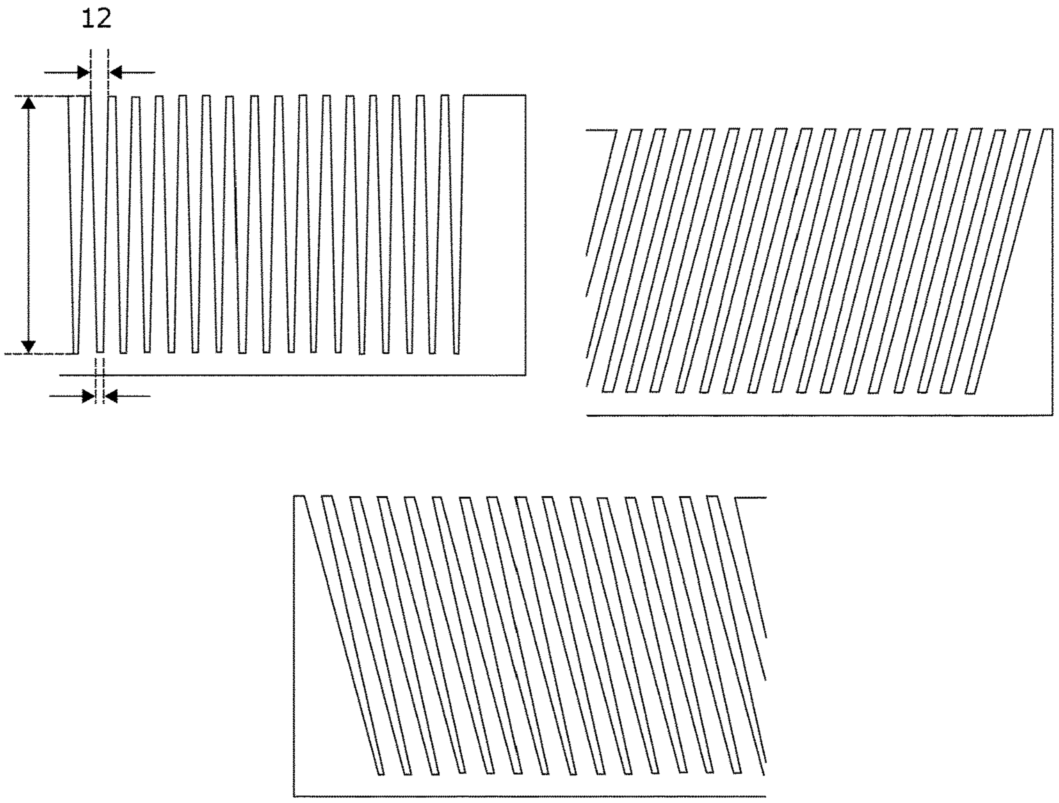
Figure 6:
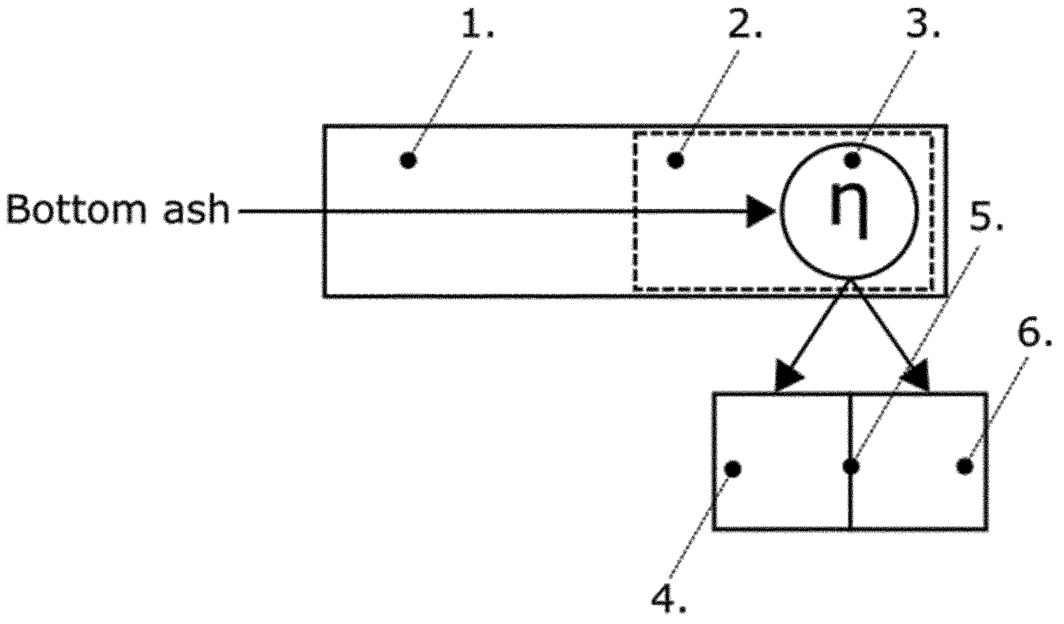
Figure 7:
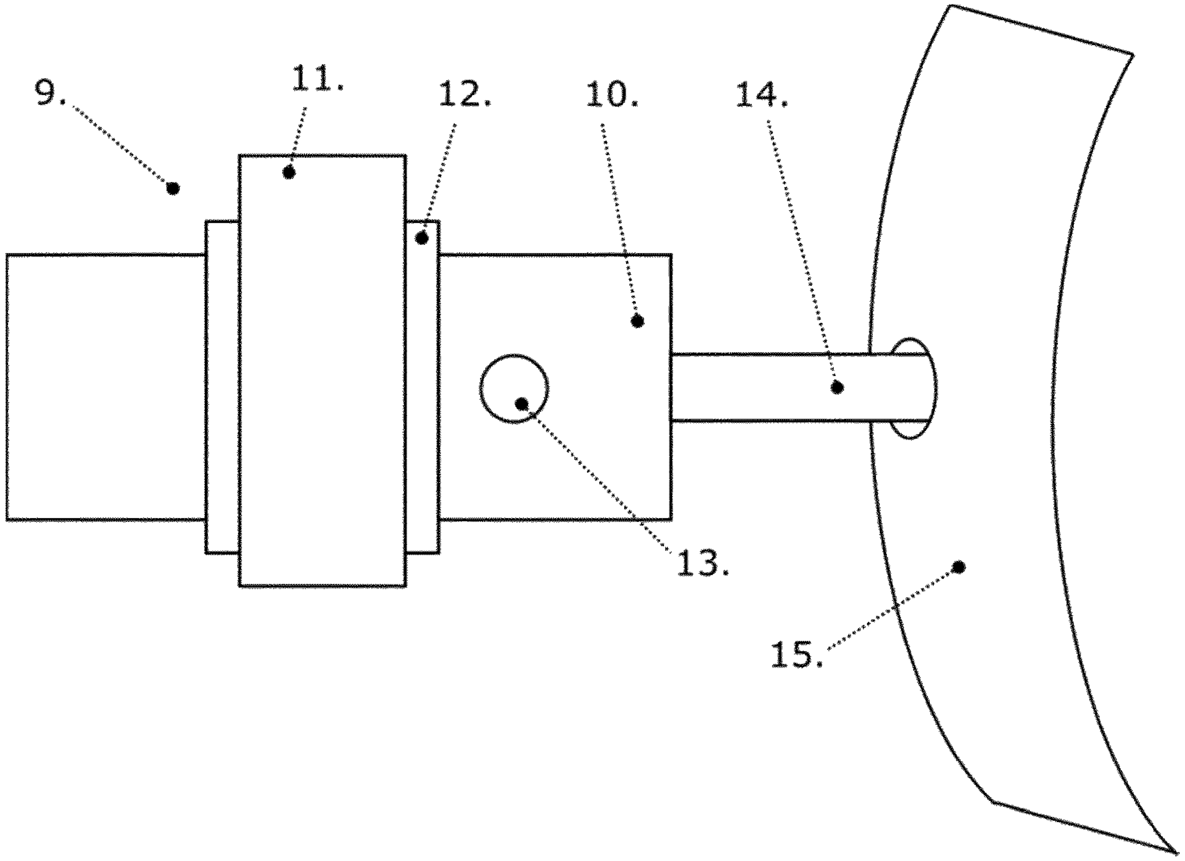

It is shown in:

FIG. 1: metal threads that have got stuck in the sieve of a prior art device;

FIG. 2: schematically a device according to the invention;

FIG. 3: in view from above the end portion of the conveyor screw and a division wall;

FIG. 4: different views of a pre-sieve according to the invention;

FIG. 5: three different pre-sieve geometries, straight, angled to the right, and angled to the left;

FIG. 6: schematically a test setup for testing different embodiments of the pre-sieve;

FIG. 7: a mechanical impact device in the form of a piston-vibrator.

First, the existing problem in prior art ash and recirculation systems for fluidized bed boilers is explained.

The boiler P14 at the plant Händelöverket is located in Östergötland County. It is operated by E.ON, an international utility company. Boiler P14 was constructed in 2002 by Kvaerner. It is a circulating fluidized-bed boiler with a nominal thermal power of 75 MW, usually fired with a mix of household waste and light industrial waste. It is operated all year around, and part of the produced steam is usually used to produce electricity. The cross section of the furnace is 2.5 m×8.4 m at the level of the fluidizations nozzles and expands to 3.9 m×8.4 m higher up. The height of the furnace from fluidization grid to roof is about 23 m. The boiler has two cyclones and two loop seals with in-bed superheaters. After the cyclones, the flue gases pass an empty pass, convective heat exchangers and several flue gas cleaning units before they are released to the atmosphere through the stack.

Boiler P14 is operated with an ilmenite containing fluidized bed and an Improbed Loop™ system as schematically disclosed in WO 2018/188786 A1.

Improbed Loop™ results in an increased concentration of ilmenite in the boiler, hence an improved distribution of oxygen, which increases the boiler efficiency, which can be utilized to increase the fuel throughput, which gives increased gate fee income, increased production of steam, electric power and heat, i.e. an improved process economy.

However, the availability of Improbed Loop™ has been reduced by mechanical blockages of the mechanical sieve by metallic objects, e.g. threads and wires.

FIG. 1 visualizes the problem. Metal threads make their way into the sieve and get stuck. The threads build up nests that eventually block the sieve inlet and holes in the sieve. Consequently, the recovery of the fine-grained part of the bottom ash will cease and the ilmenite is lost through the ash discharge.

The threads originate from the waste fuel and have managed to pass the various magnets installed in the fuel preparation and transportation system. The reason is that pieces of e.g. copper, aluminium and stainless steel are not magnetic. This is a typical situation for waste fired boilers.

FIG. 2 schematically shows a device according to the invention.

A screw conveyor 1 conveys bottom ash from the boiler towards an end portion 2 in which the lower part of the circumference of the screw is circumferentially surrounded by a pre-sieve 3. Particulate material falling through the pre-sieve 3 is falling through the front part 4 of a chute comprising a division wall 5 separating front part 4 and rear part 6. This particulate material is then falling onto a sieve 7 as in the existing prior art system to mechanically separate coarse and fine particulate fraction. The fine particulate fraction is then further separated in a magnetic separator 8 as disclosed in WO 2018/188786 A1.

Threads and other elongated objects are moved by the conveyor screw over the pre-sieve 3 and fall off at the end of this pre-sieve into the rear part 6 of the chute leading towards an ash elevator and are being discarded.

The location of the pre-sieve and the principal form is shown in FIG. 3. It is a view from inside the classifier screw 2 looking down to the chute with the division wall 5 separating the path 4 to the existing sieve in the Improbed Loop™ system to the right and the path 6 to the ash elevator to the left. The pre-sieve 3 has the geometry of multiple fingers oriented in the axial direction of the screw. The pre-sieve is mounted just below the last part of the screw. Small particles, i.e. the accept fraction, are supposed to fall between the finger-type pre-sieve down to the sieve in the Improbed Loop™ system, whereas elongated objects and metal threads, i.e. the reject fraction, are moved by the screw over the pre-sieve to the chute leading to the ash elevator. The pre-sieve will hence be continuously cleaned by the screw. Therefore, no nesting of threads or other types of blockages caused by the ash can occur.

FIG. 4 shows the pre-sieve from different angles. The fingers are tapered, and the width of the elongated openings increases from 3 mm at the bottom to 12 mm at the top or end of the fingers.

Three different pre-sieve designs were tested, distinguished by different orientation of the fingers; directed to the right, straight forward and to the left, when viewing in the axial direction of the classifier screw (FIG. 5).

In all three alternatives, the fingers are tapered in the flow direction in order to achieve an increasing gap between the fingers. This decreases the risk for blockages, e.g. due to formation of nests of metal threads. Also, the sieve is formed to fit the screw diameter and is located just below the end part of the screw so that the screw continuously moves the material over the pre-sieve and prevents it from blocking the pre-sieve. The size of the gap between the screw and the pre-sieve preferably should be less than 5% of the conveyor screw diameter. The pre-sieve is designed for easy replacement.

An experimental test set up for testing the effectiveness of the pre-sieve according to the invention is shown in FIG. 6.

The screw 1 corresponds to the bottom ash screw in boiler P14. It was operated during the test with similar rpm (speed) as the P14 screw. The screw motor is controlled by a frequency converter. The casing of screw 1 has the inner diameter 231,9 mm and the diameter of the screw threads is 200,0 mm.

An inspection box 2, with two of the sides made of plexiglass, was mounted at the end of the screw. The screw was arranged with a 12° inclination upwards, i.e. like the inclination of the P14 screw. The pre-sieve 3 was mounted under the screw end, in the inspection box. In the series of tests, the two last tests were performed with the screw in horizontal position.

Two plastic boxes, the accept box and the reject box 4 and 6, with a steel plate 5 in between, were placed below the inspection box. The plate is mounted perpendicular to the screw and so that the edge of the plate is in line with the edge of the pre-sieve, 3 cm below the screw. This arrangement simulates the ash chute in the P14 system. The idea is that the fine-grained ash shall fall between the sieve fingers to the accept box and the coarse fraction, including metal pieces, stones, gravel, etc. shall be forced by the screw along the sieve to the reject box.

A bulk of 75 kg of bottom ash from the waste-fired boiler P14 at Händelö was used for the test. Moreover, an extra bucket filled with 5 kg metal scrap (metal threads, steel plate pieces, copper wires, etc.) was used for the test.

A sieve with the mesh 0.71 mm was used for dividing a fraction of the bottom ash sample into two fractions; a finer passing the sieve and a coarser remaining on the sieve. The mass of the fractions was measured; 11400 g fine fraction and 15200 g coarse fraction. The two fractions were mixed again and approximately 300 g of metal scrap from the extra bucket, mainly metal threads, was added to the mixture.

The operating parameters and the settings in eight trials are presented in Table 1. The ash was reused in all trials and prior to each trial the fine and the coarse fractions were mixed, and the metal scrap was added to the mixture.

In trials 1 through 6 the pre-sieve to be tested was mounted approximately 1 cm below the screw thread. In trials 7 and 8 the pre-sieve was moved down to a distance from the screw of 15-20 cm and bent to the angle 30° downwards. The idea was to test the function of the pre-sieve with the material falling by gravity onto and along the pre-sieve instead of being pushed upwards be the screw.

TABLE 1

Operating parameters and settings in the 8 trials.

| Trial | Sieve | Screw inclination downstreams | Screw speed (RPM) |
|---|---|---|---|
| 1 | Straight | Upwards | 0.92 |
| 2 | Right | Upwards | 0.92 |
| 3 | Right | Upwards | 0.92 |
| 4 | Left | Upwards | 0.92 |
| 5 | Left | Upwards | 0.92 |
| 6 | Left | Upwards | 1.33 |
| 7 | Straight/inclined and lower position | Horizontal | 0.92 + higher |
| 8 | Straight/inclined and lower position | Downwards | 0.92 |

The trial commenced by starting the screw and adjusting the speed to the chosen value. The ash was feed continuously from a bucket through a chute down to the screw for further transport along the screw over the pre-sieve.

The operation was visually observed and recorded by a video camera. The mass of the fine and coarse fractions was measured.

Trials 1 through 4 used the same operating conditions and settings except that the three different pre-sieves were used.

One fundamental idea of the pre-sieve is that it shall be self-cleaning. By locating the pre-sieve close to the screw and by tapering the pre-sieve fingers, the screw is supposed to remove fastened threads or nests from the pre-sieve and transport it to the end of the screw. Trial 5 aimed at testing this idea by simulating a case in which metal threads get stuck in the pre-sieve. A nest of threads was manually made and fastened in the pre-sieve.

Trial 6 was like trial 4 except that the rotation speed of the screw was increased by 45%.

Trials 7 and 8 were carried out in order to test if the self-cleaning function observed in trials 1 through 6 was necessary for the sieving performance or if similar good results could be obtained if the ash and metal scrap mixture was accelerated by gravity down onto the pre-sieve.

The removal of scrap and threads is one of the important goals with installing the pre-sieve. Besides, it is important that the loss of fine material, potentially containing ilmenite, is low. The latter aspect was evaluated by measuring the mass of fine material in the reject box, after each trial, and comparing it with the total mass of fine material used in the trial. The loss, η, was defined as by eq. 1 where $m_{fine,\ reject}$ is the mass of fine material in the reject and $m_{fine,\ accept}$ is the mass of fine material in the accept.

$$\eta = \frac{m_{fine,rejekt}}{m_{fine,accept} + m_{fine,reject}} * 100 \tag{1}$$

In trials 1 through 6, the separation of metal scrap and metal threads was very good. The metal scrap and threads end up in the reject, as intended.

The trials also show that the pre-sieve separates 15% of other coarse ash, which transferred to P14 conditions, would mean a significant reduction of the flow to the existing sieve in the ash recirculation system, which would lead to less wear and maintenance cost.

In trial 5 a big metal thread nest was intentionally fastened on the pre-sieve. After one minute of operation of the screw, the nest was withdrawn by the screw and transported to the reject box.

The pre-sieve arrangement in trials 7 and 8 did not work well. The performance with only gravel and sand type ash was acceptable but as soon as metal threads appeared in the ash stream problems occurred. The threads got stuck in the pre-sieve and blocked the ash flow. The threads contribute to form blockages with the ash particles, even with the finer ash. The threads act as reinforcement in the blockages. Eventually, the entire pre-sieve surface is covered by blockages. The sieving function is lost, and the whole material flow goes to the reject box.

The other trials (1-6) on the other hand, were successful and demonstrate that the design of the self-cleaning pre-sieve has a great potential to remediate the blockage problems in the P14 system.

Table 2 contains the measured accept and reject mass fractions in each of the eight tests and the loss of the fine particles to the reject, η, defined in Eq.1.

The table shows that the best results were obtained with the pre-sieve Right in trial 3 in which only 1% of the fine fraction was lost with the reject in this trial. Similar good results were obtained in trials 2 (pre-sieve Right) and 4 (pre-sieve Left). Hence, the pre-sieves Right and Left appears to be equally good. The Straight pre-sieve however, gave 12% loss of the fine fraction, i.e. a significantly worse result.

TABLE 2

Results from the eight trials

| Trial | Accept (g) | Fine fraction in the accept (g) | Reject (g) | Fine fraction in the reject (g) | Loss η (%) |
|---|---|---|---|---|---|
| 1 | 3085 | 1482 | 1142 | 200 | 12 |
| 2 | 7952 | 3667 | 2487 | 144 | 4 |
| 3 | 7470 | 3682 | 1154 | 42 | 1 |
| 4 | 8830 | 3642 | 1710 | 79 | 2 |
| 5 | Na | Na | Na | Na | Na |
| 6 | 7746 | 3781 | 2125 | 200 | 5 |
| 7 | Na | Na | Na | Na | Na |
| 8 | Na | Na | Na | Na | Na |

Na: no data available

Visual observations during the trials showed that when pre-sieve Right was used, somewhat more material was accumulating on the right-hand side of the screw. This is because the material follows the thread of the screw, which is a reasonable explanation why pre-sieve Left gave a somewhat more even distribution of the material.

Trial 6 shows that even an increase of the screw speed by 45% does not affect significantly the loss of the fine fraction.

FIG. 7 shows the mechanical impact device in the form of a piston-vibrator (9). It comprises a body (10) and a piston head (14). The piston-vibrator (9) is mounted to the casing of the bottom ash screw (not shown in FIG. 7) by means of the mounting (11). A rubber cushion (12) surrounds the body (10) of the piston-vibrator (9) in order to minimize vibrations induced from the casing of the bottom ash screw. The piston head (14) protrudes through a hole in the casing (15) and hits the pre-sieve on the inside of the casing (not shown). It is operated continuously. The pre-sieve can be inclined downwards in the direction of the end portion.

The body (10) of the piston-vibrator (9) can be circular or square shaped. It can consist for example of cast iron or aluminum. The piston-vibrator (9) is operated pneumatically. The body (10) comprises a mounting for an air supply (13). The pressure of the air supplied is in the range of 1.5 to 2 bar.

The piston head (9) vibrates with a frequency of 1860 Hz at 2 bar and 2220 Hz at 6 bar pressure. It hits with a force of 50 to 200 N, preferably 80 to 150 N. The maximum sound pressure level is 80 dB(A), which is acceptable in a boiler house.

As the piston head (9) hits the pre-sieve with high frequency, it induces a vibration onto the pre-sieve. This vibration prevents finer particles such as bottom ash from forming a layer of material on the pre-sieve.

The invention claimed is:

1. Device for continuously sorting a particulate stream, comprising:

a) a conveyor (1) for conveying the particulate stream to a separation device, b) a sieve (7) for separating the particulate stream according to size, c) a pre-sieve (3) comprising elongated sieve openings formed by fingers extending towards an end portion of the pre-sieve with the tips of the fingers not being connected in that end portion, wherein the pre-sieve is located between an outlet of the conveyor and an inlet of the sieve, and wherein a portion of the particulate stream passes through the elongated sieve openings to the inlet of the sieve; and d) a mechanical impact device for providing mechanical impacts to the pre-sieve (3).

2. Device according to claim 1, characterized in that the pre-sieve (3) comprises elongated sieve openings including an angle of −40° to 40° with the conveying direction of the conveyor.

3. Device according to claim 1, characterized in that the conveyor is a screw conveyor (1).

4. Device according to claim 3, characterized in that the pre-sieve (3) encloses part of the circumference of the screw conveyor in an axial end portion of the screw conveyor.

5. Device according to claim 4, characterized in that the radial distance between the conveyor screw (1) and the pre-sieve (3) is less than 10% of the conveyor screw diameter.

6. Device according to claim 5, characterized in that the radial distance between the conveyor screw (1) and the pre-sieve (3) is less than 5% of the conveyor screw diameter.

7. Device according to claim 1, characterized in that the width of the elongate openings increases from the base to the tip of the fingers.

8. Device according to claim 7, characterized in that the increase in width is by a factor of 2 to 6.

9. Device according to claim 8, characterized in that the increase in width is by a factor of 3 to 5.

10. Device according to claim 1, comprising at least one of:

a) the width of the elongate openings at the base is between 1 and 5 mm;

b) the width of the elongate openings at the tip of the fingers is between 4 and 20 mm;

c) the length of the fingers from base to tip is between 100 and 500 mm;

d) the mesh size of the sieve (7) is between 200 and 1,000 μm.

11. Device according to claim 10, comprising at least one of:

a) the width of the elongate openings at the base is between 2 and 4 mm;

b) the width of the elongate openings at the tip of the fingers is between 10 and 14 mm;

c) the length of the fingers from base to tip is between 150 and 250 mm; and d) the mesh size of the sieve (7) is between 300 and 800 μm.

12. Device according to claim 1, characterized in that the mechanical impact device is a hammer or piston-vibrator.

13. Device according to claim 1, characterized in that the impacting force and impacting frequency of the mechanical impact device is controllable.

14. Device according to claim 1, characterized in that the mechanical impact device provides impacts in the area of the base of the fingers of the pre-sieve (3).

15. The use of a device of claim 1 for the separation of a particulate ash stream from a fluidized bed boiler.

16. A method for operating a fluidized bed boiler, comprising the steps of:

a) carrying out a fluidized bed combustion process;

b) removing at least one ash stream from the fluidized bed boiler;

c) separating the ash stream into at least two fractions, wherein the separation includes a separation step using the device according to claim 1;

d) recirculating a separated particle fraction into the bed of the fluidized bed boiler.

17. The method of claim 16, characterized in that the boiler is a circulating fluidized bed boiler (CFB) or a bubbling fluidized bed boiler (BFB).

18. The method of claim 16, characterized in that the fluidized bed and the ash stream from the fluidized bed comprise ilmenite particles and that the separated recirculated particle fraction is enriched in ilmenite.

19. The method of claim 15, characterized in that the separation includes a step of using a magnetic separator (12) comprising a field strength of 2,000 Gauss or more.

20. The method of 16, characterized in that the field strength is 4,500 Gauss or more.

21. The method of claim 18, characterized in that the fraction of ilmenite in the bed material is 25 wt. % or more.

22. The method of claim 21, characterized in that the fraction of ilmenite in the bed material is 30 wt. % or more.

* * * * *